Figure 1:
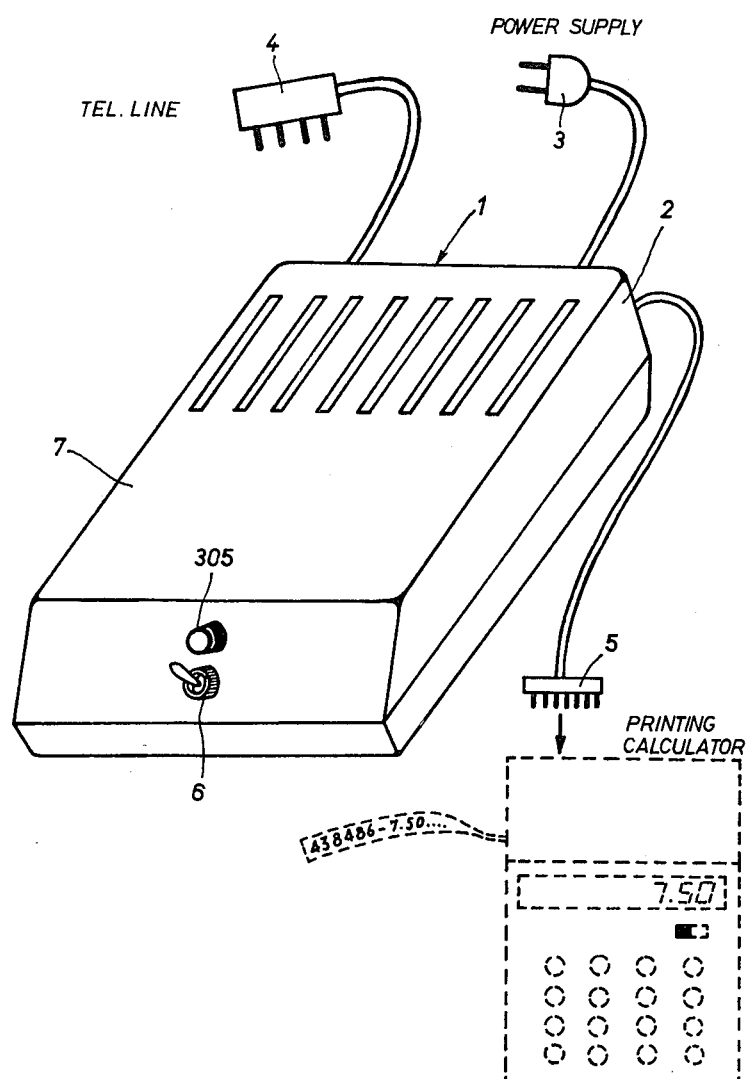

United States Patent [19]

Rouiller

[11] 4,065,640

[45] Dec. 27, 1977

[54] APPARATUS FOR INTERCONNECTING A TELEPHONE LINE AND A PORTABLE CALCULATOR

[75] Inventor: Jean Marie Rouiller, Couvet, Switzerland

[73] Assignees: Stoppani S.A., Establissements pour la mecanique de precision et l'electro-mecanique, Bern; Oliver Technik AG, Zurich, both of Switzerland

[21] Appl. No.: 706,590

[22] Filed: July 19, 1976

[30] Foreign Application Priority Data

July 31, 1975   Switzerland ................. 10012/75

[51] Int. Cl.² ........................................ H04M 15/00
[52] U.S. Cl. ............................. 179/7.1 TP; 179/7R
[58] Field of Search ............. 179/7.1 TP, 7.1 R, 7 R, 179/7 MM, 8 R; 235/92 TE

[56] References Cited

U.S. PATENT DOCUMENTS

| 3,324,242 | 6/1967 | Gattner | 179/7.1 R |
| 3,342,940 | 9/1967 | Gattner | 179/7.1 R |
| 3,851,102 | 11/1974 | Bauernfeind | 179/7.1 TP |

FOREIGN PATENT DOCUMENTS

| 1,173,146 | 7/1964 | Germany | 179/7.1 R |
| 1,184,814 | 1/1965 | Germany | 179/7.1 R |
| 565,490 | 8/1965 | Switzerland | 179/7.1 TP |

Primary Examiner—William C. Cooper
Assistant Examiner—Joseph A. Popek
Attorney, Agent, or Firm—LeBlanc & Shur

[57] ABSTRACT

An apparatus for interconnecting a telephone line and a calculator having a printer and display means, wherein input detecting means are provided for recognizing dialing pulses and charge pulses on the telephone line, and output driving means are provided for acting upon the calculator only at points thereof corresponding to input keys and switches thereof which usually serve also to introduce values and give operating orders to the calculator, this output driving means being arranged first to control the printer for causing it to print telephone numbers in accordance with the number of dialing pulses detected by the input detecting means, then to control an addition process in the calculator for causing its display to indicate the charges successively incurred during a call, and finally to control the printer for causing it to print the total charges incurred during this call after the line has been restored.

9 Claims, 4 Drawing Figures

APPARATUS FOR INTERCONNECTING A TELEPHONE LINE AND A PORTABLE CALCULATOR

This invention relates to apparatus for interconnecting a telephone line and a calculator equipped with a printer, with display means, and with input members in the form of keys or the like for introducing numeric values and operating orders, the apparatus being of the type which controls the calculator as a function of dialing and charge data appearing on the telephone line and which causes the calculator to print a called telephone number, to display the charges successively incurred during the call, and to print the total charge for the call upon termination thereof.

Apparatus belonging to the same category, but much more complicated and cumbersome, is already available on the market. It detects and prints all telephone calls made to or from a certain subscriber station, furnishing detailed data concerning the time, telephone numbers, charges, etc. However, such apparatus is intended to be installed only at a telephone exchange, connected to a subscriber line, and it is extremely complicated and expensive; it would hardly be feasible to contemplate its use for private purposes.

There also exists, in connection with the public telephone booths situated in post offices with a nearby telephone exchange, apparatus which prints on a tape the charges to be paid at the post-office window by users of the booths. Here, too, such apparatus is relatively complicated and is intended for operation only in conjunction with a telephone exchange.

Also known are charge-indicators connected to telephones installed in public places, for example; these purely mechanical charge-indicators show the charges to be paid, but not the number called. They comprise a mechanical counter arrangement and are intended to furnish the indication only temporarily.

Finally, subscriber equipment has recently been proposed which, in connection with a subscriber station or a PBX, e.g., in a hotel, enables the conditions of private telephone calls to be detected; it computes the charges and then causes them to be printed, together with the other desired data, on a commercial-type printer. Such equipment is also relatively complicated and comprises the whole calculating arrangement for adding up the charge units, only the total of which is communicated to the printer. Besides having the disadvantage of requiring an expensive printing machine, and of being fairly expensive itself, this equipment has the drawback of not enabling the person telephoning to follow the charges progressively incurred for his call.

In addition to pocket-size electronic calculators provided with a display but no printer, and to large-scale electronic calculators provided with a display and capable of operating in conjunction with a printer, but being expensive and cumbersome, there have recently appeared on the market small pocket-size electronic calculators equipped with a linear printer, i.e., one which prints on a paper tape. Obviously, anyone who owns such a small calculator must be able to use it at any time and would not wish to devote it permanently just to checking telephone calls. On the other hand, it will be realized that all the electronic elements necessary for calculating (adding) telephone charges are included in these small calculators, which are reasonable in price since they are mass-produced.

The general idea behind the present invention is to take maximum advantage of the favorable possibilities offered by a small printing calculator of the aforementioned kind in order to solve the problem of monitoring telephone numbers called and charges for the calls while leaving the small calculator free for its other possible uses, both when it is connected as an accessory of a telephone and when it is disconnected and carried about independently.

It is an object of this invention to provide apparatus of the type initially mentioned which, although not itself a calculator, and while remaining simple, compact, and inexpensive, enables the interconnection of a telephone line and a small calculator having a display and a printer, and which is also designed to offer the following advantages at the lowest possible cost:

monitoring of telephone calls with a printout of the number called and of the total charge for each call;

immediate display of the telephone charges as they are progressively incurred during the course of the call;

the possibility of cnnecting the installation permanently at a location not accessible to everyone (for example, in order to check the calls made from a subscriber's telephone in his absence);

freedom from the onerous necessity of having to immobilize costly calculating and storage facilities which are in actual operation for only a small part of the time.

According to the present invention there is provided interconnecting apparatus of the type initially described which further comprises first means connected to the telephone line for separately detecting dialling-type pulses and charge-type pulses, second means for establishing connections to the calculator only at points corresponding to the input members, processing means connected to the first means for recognizing and processing true dialling pulses, order-transmitting means connected to the second means and to the processing means for controlling the printing by the printer of numeric values corresponding to pulse trains formed by the dialling pulses, and calculation and charge-printing control means connected to the first means and to the order-transmitting means for recognizing true charge pulses and for emitting for each charge pulse a control sequence for adding a charge unit, the sequence comprising elementary orders which are transmitted by the order-transmitting means to the calculator via the second means, thereby causing the calculator to display the total of the charge units, the processing means being designed to recognize the end of a call, and the control means being connected to the processing means for receiving an end-of-call signal and for thereupon emitting a charge-printing order which is transmitted by the order-transmitting means to the calculator, thereby causing the calculator to print the displayed total.

Figure 2:
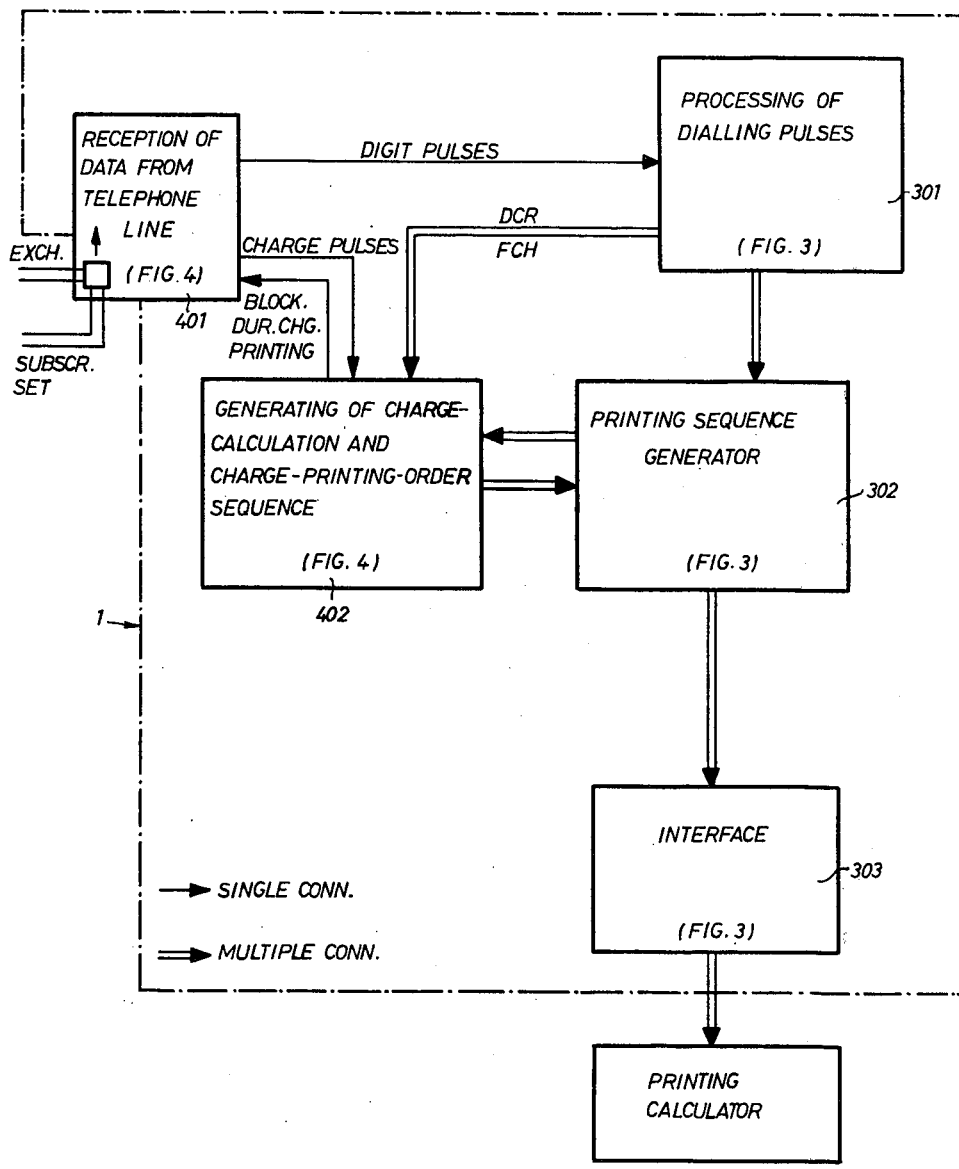
Figure 3:
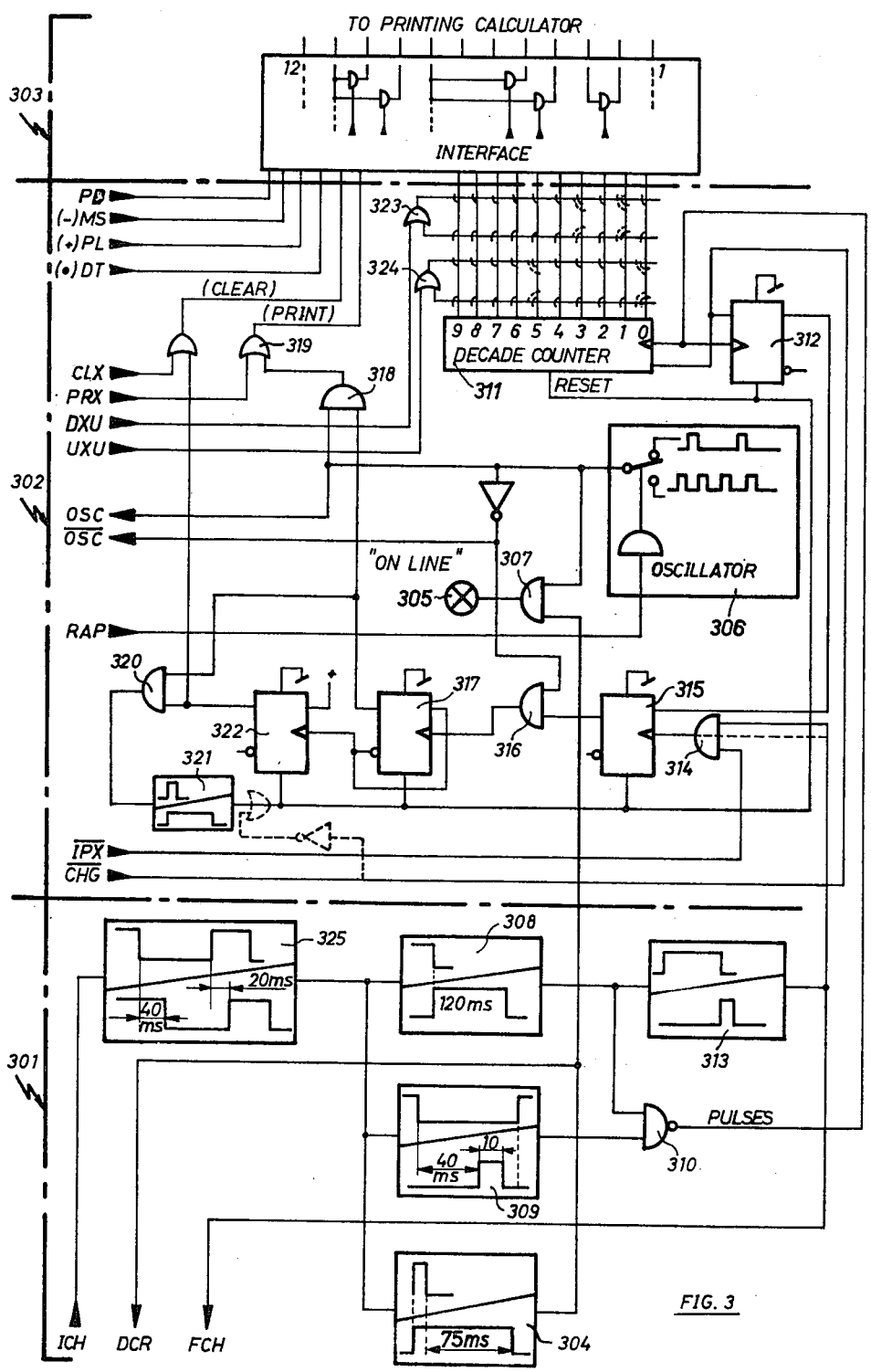
Figure 4:
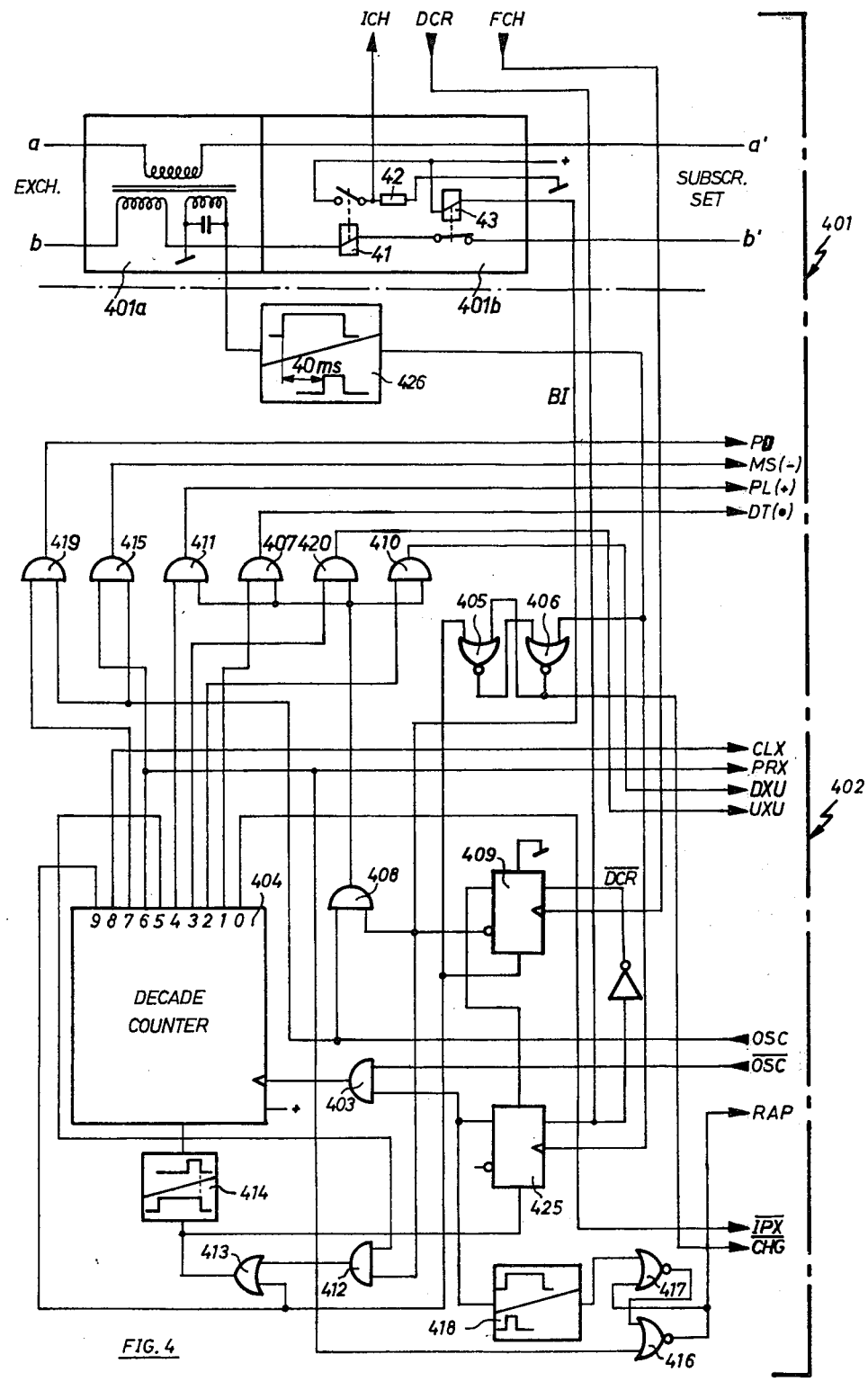

A preferred embodiment of the invention will now be described in detail with reference to the accompanying drawings, in which:

FIG. 1 is a perspective view of an apparatus interconnecting a telephone line and a calculator, the apparatus being shown in approximately actual size, FIG. 2 is an overall block diagram of the various operating parts of the apparatus of FIG. 1, and FIGS. 3 and 4 are logic diagrams in more detail of circuits shown in FIG. 2.

FIG. 1 illustrates the outside appearance of an interconnecting apparatus 1 accommodated in a substantially parallelepiped-shaped housing 2 with an inclined front face. The apparatus 1 comprises an electric supply plug 3, a telephone line plug 4, and a multipole plug 5 for connection to a printing calculator. It is to be noted that the size of the top surface 7 of the housing 2 is such that the printing calculator, of the pocket-size electronic type, may rest flat on the housing 2 so as to form a relatively compact unit with the apparatus 1. The plug 5, shown in FIG. 1 as being attached to the end of a relatively short cable, might also be built into the top surface 7 of the apparatus 1 so that the connection to the printing calculator (provided in that case with a corresponding socket in the bottom) is automatically established when the calculator is placed on the apparatus 1.

FIG. 1 also shows a main switch 6 as well as a signal lamp 305, also appearing in FIG. 3, which lights up whenever the apparatus 1 is in full operation, i.e., while it is monitoring a call made over the telephone line. As long as the signal lamp 305 is lit, the calculator should not be used for other purposes; when the signal lamp 305 is out, the calculator may be used for all the operations for which it is normally intended, even while left in place on the housing 2.

In a reduction to practice of the present invention, a prototype of the interconnecting apparatus was successfully used with a pocket-size electronic printing calculator sold under the trademark "CASIO," which, apart from having a printer, is a usual type of this kind of instrument. The special printing function is controlled by two control members situated on the face of the calculator. One is a two-position switch, the "PRINT" position of which causes all data introduced into the calculator to be printed automatically, while the other position suspends the printing function unless the second control member is operated. This second control member is a push button which returns to the inoperative state when released; when pushed, it causes the calculator to print the result displayed at that moment even though the two-way switch is not in the "PRINT" position. The data are printed in a single line along a tape, so that the various printed indications must be separated by blank spaces or special markings. When the calculator is set for printing all data introduced, operation of the "CLEAR" key, for instance, causes the letter "C" to be printed.

FIG. 2 is a general structural diagram of the apparatus 1. It may be seen to comprise a unit 401 for receiving data from the telephone line and for detecting separately the digit pulses, i.e., the dialling pulses of a number called, and the charge pulses. The digit pulses, consisting of brief cut-offs of the telephone line, are supplied to a dialling-pulse processing unit 301 comprising delay circuits for distinguishing the true dialling pulses, having a duration within a certain range, from possible momentary cut-off interference pulses which may also occur. The pulse-processing unit 301 detects the end of each pulse train forming a digit; it likewise detects the end of a call, i.e., the fact that the line is cut off for a period of time exceeding the maximum duration of a dialling pulse.

The receiving unit 401 supplies the charge pulses detected to a unit 402 for generating the charge-calculation and charge-printing-order sequence. The unit 402 also receives two information signals from the processing unit 301, viz., DCR indicating that the line is in use (DCR = 0 when the call is finished), the FCH which is a pulse appearing whenever no new cut-off pulse is produced during a 120-ms period following one or more cut-off pulses having lasted at least 40 ms. A "charge unit" is established directly within the apparatus 1, where it may be modified, if necessary, by changing the internal wiring with the aid of screws, strips, or the like. When the unit 402 receives a charge pulse while the line is in use (signal DCR), it emits an addition calculating sequence comprising, first, two numerical values and, if need be, a decimal point, and next an addition operation instruction, i.e., an instruction to record as an addend. This sequence is supplied to a unit 302 for generating printing sequences, which also receives from the processing unit 301 the dialling pulse data and the end-of-pulse-train signal FCH (which is also supplied once at the end of the call).

No charge pulse is normally transmitted during the occurrence of dialling pulses, and the printing-sequence generator 302 operates as a function of the dialling pulses. Once a charge pulse has been supplied, however, the printing-sequence generator 302 is no longer capable of processing dialling pulses (which no longer occur at this stage in any event) inasmuch as it then is occupied with transmitting orders for the charge calculating sequence. Upon termination of the call, i.e., when the signal DCR has disappeared, one more FCH pulse is transmitted to the circuit 402 which generates the charge-calculating and charge-printing-order sequence; and under these conditions, the circuit 402 emits an order for total clearance of the calculator register. Just before transmitting this order to print the displayed total, the circuit 402 also transmits a preliminary order to print a particular symbol, preferably a minus sign (−), in order to separate the called telephone number from the total charge for the call on the printed tape.

The unit 302 for generating printing sequences sets up the required orders for ensuring proper operation of the calculator, especially of the printer. When the dialled number is printed, the unit 302 first counts the dialling pulses of each pulse train so as to establish a numerical value, then it must apply this numerical value to the input elements of the calculator and cause the latter, with the aid of the "PRINT" control, to start printing the data introduced, so that the numerical value (or digit) will be printed, after which it must cause the calculator to cease automatic printing before transmitting a total clearance order (for otherwise the symbol "C" would be printed after each digit of the telephone number). The unit 302 carries out these operations for each of the pulse trains defining a telephone number dialled.

Thereafter, the task of the unit 302 is confined to transmitting, by means of gates, the orders it receives from the unit 402. The unit 302 further comprises an oscillator, the frequency of which times the transmission of orders both for the printing of the digits of the number dialled and for the introduction of the charge unit to be added by the calculator, as well as for orders relating to the printing of the total charge. When the printer of the calculator is supposed to operate, the orders cannot be given at a very rapid rate because of the electromechanical parts to be actuated. When the charge units to be added are transmitted, on the other hand, the orders must be given at a rapid rate; for according to the telephone charge system involved, the charge pulses may occur in very quick succession, and each of them must give rise to a sequence of orders for summing the charge unit. There is a particularly rapid succession of charge data in the case of charge systems in which a variable charge, i.e., a variable number of pulses, is transmitted at fixed intervals. On the other hand, the charge pulses generally succeed one another less rapidly in systems which always transmit a single charge pulse, but at intervals which may be longer or shorter depending upon the rate charged for the particular call. In order to meet this dual requirement of slow timing for printing and quick timing for transmitting the addends, the oscillator contained in the unit 302 may be switched to two different modes of operation, in one of which it supplies a high-frequency binary signal and in the other of which it supplies a lower-frequency binary signal. When in resting state, the oscillator operates at the lower frequency, it is switched to the higher frequency upon the appearance of the first charge pulse, and it is returned to the lower frequency at the end of the call, prior to transmission of the order to print the total charge.

It should also be noted that when the line has been restored (end of the call), there may be a not entirely negligible lapse of time until the charge is printed. During this time, there must be no possibility of allowing the line to be seized and a new number dialled. Therefore, the unit 402 sends the receiving unit 401 a signal for "blocking during charge printing" which causes the line to be cut off during the brief period (not exceeding one or two seconds) during which the printing of the charge is ordered once the call has terminated.

Also shown in FIG. 2 is an interface unit 303, the main task of which is to adapt the conditions under which the order signals are supplied by the printing-sequence generating unit 302 and the conditions under which the orders must be applied to the printing calculator.

The interface unit 303 mainly comprises the gates which are controlled by orders emanating from the unit 302 and which are connected, on the calculator side, between two conductors connected in parallel, by means of a connector, to the make contacts of the keys or control members of the printing calculator. The supply voltages of the calculator and the apparatus 1 must naturally be adapted to one another, which presents no difficulty; as a variation, it is even possible to operate both pieces of equipment with the same DC voltage source.

FIGS. 3 and 4 are detailed logic diagrams of the units just described in connection with FIG. 2. Based on the foregoing explanations, these diagrams will be readily understandable to those skilled in the art, so that it will suffice to give below a brief description of the operation of the apparatus 1 in the light of these detailed diagrams.

The circuit elements processing the dialling pulses will be considered first. The operation of this portion of the apparatus 1 may be described as follows:

When the telephone receiver is lifted, a relay element 41, preferably consisting of an optoelectronic coupling element designed for ordinary telephone current, closes its contact and causes a voltage drop in a resistor 42, thus producing a positive voltage on a conductor ICH, which positive voltage persists as long as the line is closed and temporarily disappears during the brief cut-offs constituting the dialling pulses. After a delay of 40 ms, occasioned by a filter 325 which thus eliminates interference pulses, the pule signal produced by the relay 41 actuates a unidirectional delay circuit 304 which acts like a relay, reacting immediately upon pull but being delayed for 75 ms upon drop-out. The circuit 304 emits the signal DCR and causes the lamp 305 to flash in rhythm with an oscillator 306 via an AND gate 307. The lamp 305 indicates that the apparatus 1 is functioning on the telephone line. When a number is dialled, the voltage at the terminals of the resistor 42 will constitute a signal reproducing the image of the dialling pulses. After passing through the filter 325, this signal is supplied to the delay circuit 304, to a delayed circuit 309 constituting both a pulse-duration discriminator and a control-pulse generator for a decimal-output counter 311, and to a re-triggerable monostable circuit 308 which changes state with the leading edge of the first cut-off pulse and remains in the changed state for 120 ms, this period recommencing from zero each time the leading edge of a new cut-off pulse appears. The inverted product of the output signals of the circuits 308 and 309, produced in a NAND gate 310 supplies counting pulses to the decade counter 311, the first of these pulses causing a flip-flop 312 to flip, and the reversed state of the flip-flop 312 indicating that at least one pulse has been validly transmitted to the counter 311. A signal $\overline{CHG}$, which is at the binary level 1 only as long as a charge pulse has not occurred, is applied to the inhibiting input of the counter 311 and to the preselection input of the flip-flop 312, which means that these elements are allowed to flip only as long as charging has not yet started. If ten dialing pulses are applied to the decade counter 311, the latter returns to its initial state, which is the zero state, and this is correct because in automatic telephony, the numerical value zero corresponds to ten pulses.

After a lapse of 120 ms from the last pulse of the number dialled, the monostable circuit 308 returns to the zero state, and this drop produces an end-of-number pulse FCH with the aid of a differentiation circuit 313. The pulse FCH starts the process of printing the number corresponding to the state of the decade counter 311, and it is here that the role of the flip-flop 312 intervenes; for if a cut-off pulse, long enough to have passed the filter 325, was not, however, long enough to actuate the discriminator circuit 309 as well, this pulse would nevertheless actuate the monostable circuit 308 and would cause a pulse FCH to be supplied. Under these conditions, the decade counter 311 would not have received any pulse and would still be in the zero state, but this zero state would not correspond to a train of ten dialling pulses. In this case, the flip-flop 312 would not have flipped either, and its output level, applied to the select input of a flip-flop 315, would prevent the number-printing process. If the counter 311 has actually established a numeric value, the pulse FCH will cause the flip-flop 315 to flip via a gate 314, which it cannot pass, however, unless a signal $\overline{IPX}$ is at the binary level 1, indicating that the apparatus 1 is neither counting nor printing the charge at that moment. As a variation, this check might be made on the basis of the signal $\overline{CHG}$ as shown in dashed lines in FIG. 3. When the flip-flop 315 has flipped pulses $\overline{OSC}$ emitted by an oscillator 306 can pass to the pulse input of a flip-flop 317, connected as a divider-by-two, through an AND gate 316. The product of the signal OSC and the output signal of the flip-flop 317 is applied, through an AND gate 318 and an OR gate 319, to the printing calculator via the interface 303 so as to give the calculator the order to switch over to "printing" for a moment, thus causing it to print the numeric value contained in the decade counter 311, which value corresponds to the last number dialled.

The return of the flip-flop 317 causes the flipping of a flip-flop 322, the reversal of which to the 1 state sends a total clearance order to the calculator; then the product of the two output signals in the 1 state of the flip-flops 317 and 322, established in an AND gate 320, actuates a monostable circuit 321, the output pulse of which resets the flip-flops 312, 315, 317, and 322, as well as the decade counter 311.

The same process is repeated for each number dialled.

The circuitry processing the charge pulses will now be considered. Its operation may be explained as follows:

The charge pulses at 12 kHz (or, as a variation, at 50 Hz), which are sent out on the line by the telephone exchange, are detected by a suitable transformer circuit 401a, the pulses then being rectified and shaped by a delay circuit 426. The circuit 426 supplies a pulse at its output only if the charge pulse has lasted at least 40 ms, thus excluding the passage of any interference pulses on the line. The pulse produced by the circuit 426 causes the flipping of a flip-flop 425 which can flip only if the signal DCR coming from the circuit 304, confirming that the line is in use, which signal is applied to the pre-selection input of the flip-flop 425, is in the 1 state. The flipping of the flip-flop 425 allows the pulses OSC to reach the counting input of a decade counter 404, through an AND gate 403. The counter 404 produces the calculating and charge-printing sequence.

The derivative of the output signal of the flip-flop 425, established in a differentiator 418, causes the flipping of a bistable R-S composed of two NOR gates 417 and 416, the output of which signals a signal RAP which is applied to the oscillator 306 to cause it to operate more rapidly, thus enabling the apparatus 1 to process charge pulses coming in at a quick tempo, as happens in the case of long distance calls.

In resting condition, the first output of the counter 404 is in the 1 state, all the other outputs being in the zero state. This first output supplies the signal $\overline{IPX}$, which changes to zero upon the first counting pulse and prevents any possible number-printing cycle by disabling the gate 314. Moreover, a bistable R-S composed of NOR gates 405 and 406 supplies the signal $\overline{CHG}$ mentioned above, which changes to zero on the appearance of the first charge pulse and which, from then on, disables the counter 311 and the flip-flop 312. Thus a number which might possibly be dialled during the course of a telephone conversation is disregarded.

When the three outputs 1, 2, and 3 of the counter 404 change to the binary level 1, a level 1 modulated by the signal OSC is successively applied to the points DT (corresponding to the decimal point), UXU (corresponding to the units digit of the charge unit), and DXU (corresponding to the tens digit of the charge unit). As shown by the wiring illustrated above the decade counter 311 in FIG. 3, the signal DXU introduces the numeric value 1, while the signal UXU introduces the numeric value zero. Preceded by the decimal point, this represents charge unit values of, for instance, 10 cents or 10 pence. Another possibility shown in dashed lines is a charge unit value of 0.35, with DXU corresponding to 3 and UXU corresponding to 5. Any other combination is possible as well.

Thereafter, the change of output 4 of the counter 404 to the binary level 1 applies a level 1 modulated by the signal OSC to the point PL (+), which in turn applies to the calculator, via the interface 303, an order to add, i.e., an order to record as an addend, the value which has just been introduced (in the present example, 0.10 or 0.35).

The output 5 of the counter 404 resets the latter through an AND gate 412 and an OR gate 413 and a delay circuit 414. The flip-flop 425 is reset by the pulse controlling the delay circuit 414, hence just before the resetting of the decade counter 404. Thus the sequence of counting a charge pulse is terminated.

When the telephone receiver is replaced, the pulse FCH is once more emitted, as already mentioned above, by the differentiator 313, causing a flip-flop 409 to flip, the preparation input of which is set to the binary level 1 by the signal $\overline{DCR}$ because the telephone is hung up. The flip-flop 409 produces the charge-printing sequence. By means of a zero level at its inverse output, it disables, via an AND gate 408, and AND gates 407, 410, 411, and 420 which allowed the passage of the addition sequence orders for the charge unit. Simultaneously, the flip-flop 409 obliges the flip-flop 425 to remain in the 1 state by means of the latter's set input. Finally, the inverse output of the flip-flop 409 disables the gate 412, the result of which is that the resetting of the counter 404 does not take place at its output 5. The counter 404 therefore passes to its next output, and at this output 6, it transmits, via an OR gate 319, a printing order PRX which causes the calculator to switch over to printing, and at the same time applies to the input of the calculator, through an AND gate 415 controlled by the signal OSC, an order to subtract. The combination of these two orders has only the effect of causing the printing of the minus sign (−) on the tape of the printer. Simultaneously, the signal PRX is applied to the NOR gate 416, which resets the RAP signal so that the frequency of the oscillator 306 becomes slow again.

In a like manner, the output 7 of the counter 404 gives the calculator the order PD, through an AND gate 419, to print the charge accumulated in its registers and displayed at that moment by its display device; for that purpose, the calculator is controlled by its temporary printing control input (non-automatic printing operation).

The output 8 of the counter 404 causes the total resetting of the calculator by transmitting an order CLX.

Finally, the output 9 of the counter 404 resets the flip-flops 409 and 425, as well as the inhibiting flip-flop composed of the gates 405 and 406.

It is also to be noted that when the flip-flop 409 is in reversed state, it supplies through its inverse output a voltage BI which causes pulling of a relay 43 in the detector device 401b. A rest contact of the relay 43 temporarily cuts off the telephone line to ensure that printing is properly concluded before the telephone line may be engaged again.

It will also be noted that the interconnection apparatus may cooperate equally well with either a calculator printing on a tape leaving it horizontally, as shown in FIG. 1, or with a calculator printing on a tape leaving it vertically. In the latter case, the order to print the minus sign (−), used to separate the amount of the total charge from the number called, would be preceded by an order to advance the tape vertically. Likewise, the final total clearance order would be accompanied by an order to advance the tape vertically, possibly indexed for a double advance, in order to prepare for printing the next indication on a blank line of the tape. Other than that, operation with a vertical-tape calculator would be similar to what has been described above.

What is claimed is:

1. An apparatus for interconnecting a telephone line and a calculator equipped with a printer, with display means, and with input members in the form of keys or the like for introducing numeric values and operating orders, said apparatus being of the type which controls said calculator as a function of dialling and charge data appearing on said telephone line and which causes said calculator to print a called telephone number, to display the charges successively incurred during the call, and to print the total charge for said call upon termination thereof, the improvement comprising:

- first means connected to said telephone line for separately detecting dialling-type pulses and charge-type pulses,
- second means for establishing connections to said calculator only at contacts corresponding to said input members,
- processing means connected to said first means for recognizing and processing true dialling pulses,
- order-transmitting means connected to said second means and to said processing means for controlling the printing by said printer of numeric values corresponding to pulse trains formed by said dialling pulses, and
- calculation and charge-printing control means connected to said first means and to said order-transmitting means for recognizing true charge pulses and for emitting for each charge pulse a control sequence for adding a charge unit, said sequence comprising elementary orders which are transmitted by said order-transmitting means to said calculator via said second means, thereby causing sold calculator to display the total of said charge units,
- said processing means being responsive to the end of said call for generating an end-of-call signal, and said control means being connected to said processing means for receiving an end-of-call signal said for thereupon emitting a charge-printing order which is transmitted by said order-transmitting means to said calculator, thereby causing said calculator to print said displayed total.

2. Apparatus in accordance with claim 1, wherein said input members comprise keys having make contacts, wherein said second means comprises an interface circuit having output conductors connected to said make contacts, a plurality of gates, and a plurality of inputs, each of said gates being connected between two output conductors so that the rendering conductive of said gates is equivalent to the pressing of respective said keys, and each of said inputs controlling a said gate and corresponding to a respective said key.

3. Apparatus in accordance with claim 1, wherein said processing means comprise delay circuits for distinguishing said true dialling pulses from interference cut-off pulses and for recognizing the end of a said call by detecting a cut-off of said telephone line lasting longer than the maximum duration of a said dialling pulse.

4. Apparatus in accordance with claim 1, wherein said order-transmitting means comprises a counter for counting the number of pulses in a said pulse train, the state reached by said counter at the end of said pulse train determining a numeric value corresponding to a said calculator input member, and means for causing the transmission to said calculator, after counting the pulses is said pulse train, of an order to print said numeric value applied to a said calculator input member via said second means, followed by a total clearance order.

5. Apparatus in accordance with claim 1, wherein said calculation and charge-printing control means comprises a counter for carrying out a counting cycle for each charge pulse detected and thereby producing said sequence for adding a charge unit, said sequence comprising firstly the transmission of three data signals corresponding to the three outputs of said counter immediately following its resting state, at least two of said three data signals being numeric value data and one optionally being a decimal point datum, secondly the transmission of an order to add an addend, and thirdly an order to reset said counter, said reset order being transmitted when said counter is used to produce said control sequence for adding a charge unit.

6. Apparatus in accordance with claim 5, wherein said counter is also used for causing the transmission of said charge-printing order, said apparatus further comprising means which are then actuated for inhibiting the transmission of said three data signals, of said adding order, and of said reset order, whereby the cycle of said counter then continues through subsequent outputs thereof for causing the transmission firstly of an order to print a particular symbol, secondly of said charge-printing order, thirdly a total clearance order, and lastly an unconditional order to reset said counter.

7. Apparatus in accordance with claim 6, further comprising, for controlling the advance of said counter in said calculation and charge-printing control means, an oscillator capable of supplying a binary signal at two different frequencies, and means for switching said oscillator to the higher of said frequencies when, during a said call, said counter produces said sequence for adding a charge unit, and for switching said oscillator to the lower of said frequencies when, upon completion of said call, said counter produces said order to print a particular symbol.

8. Apparatus in accordance with claim 7, wherein said order-transmitting means comprises a counter for counting the number of pulses in a said pulse train, the state reached by said counter at the end of said pulse train determining a numeric value corresponding to a said calculator input member, and means for causing the transmission to said calculator, after counting the pulses in said pulse train, of an order to print said numeric value applied to a said calculator input member via said second means, followed by a total clearance order, and wherein said oscillator, when operating at said lower frequency, is used in conjunction with said order-transmitting means during printing of said called telephone number, said oscillator then timing the successive transmission of said order to print said numeric value applied to said calculator input members followed by said total clearance order.

9. Apparatus in accordance with claim 6, wherein said order to print a particular symbol is an order to print a minus sign.

* * * * *

UNITED STATES PATENT AND TRADEMARK OFFICE
CERTIFICATE OF CORRECTION

PATENT NO. : 4,065,640

DATED : December 27, 1977

INVENTOR(S) : Jean Marie Rouiller

It is certified that error appears in the above-identified patent and that said Letters Patent are hereby corrected as shown below:

Column 2, line 21, "cnnecting" should be --connecting--.

Column 7, line 32, "signals" (first occurrence) should be --supplies--.

Column 9, line 32, "sold" should be --said--.

Column 10, line 3, "is" should be --in--.

Signed and Sealed this

Seventeenth Day of October 1978

[SEAL]

Attest:

RUTH C. MASON
Attesting Officer

DONALD W. BANNER
Commissioner of Patents and Trademarks